No. 702,992. Patented June 24, 1902.
P. PECOR.
BICYCLE.
(Application filed June 28, 1899.)
(No Model.)
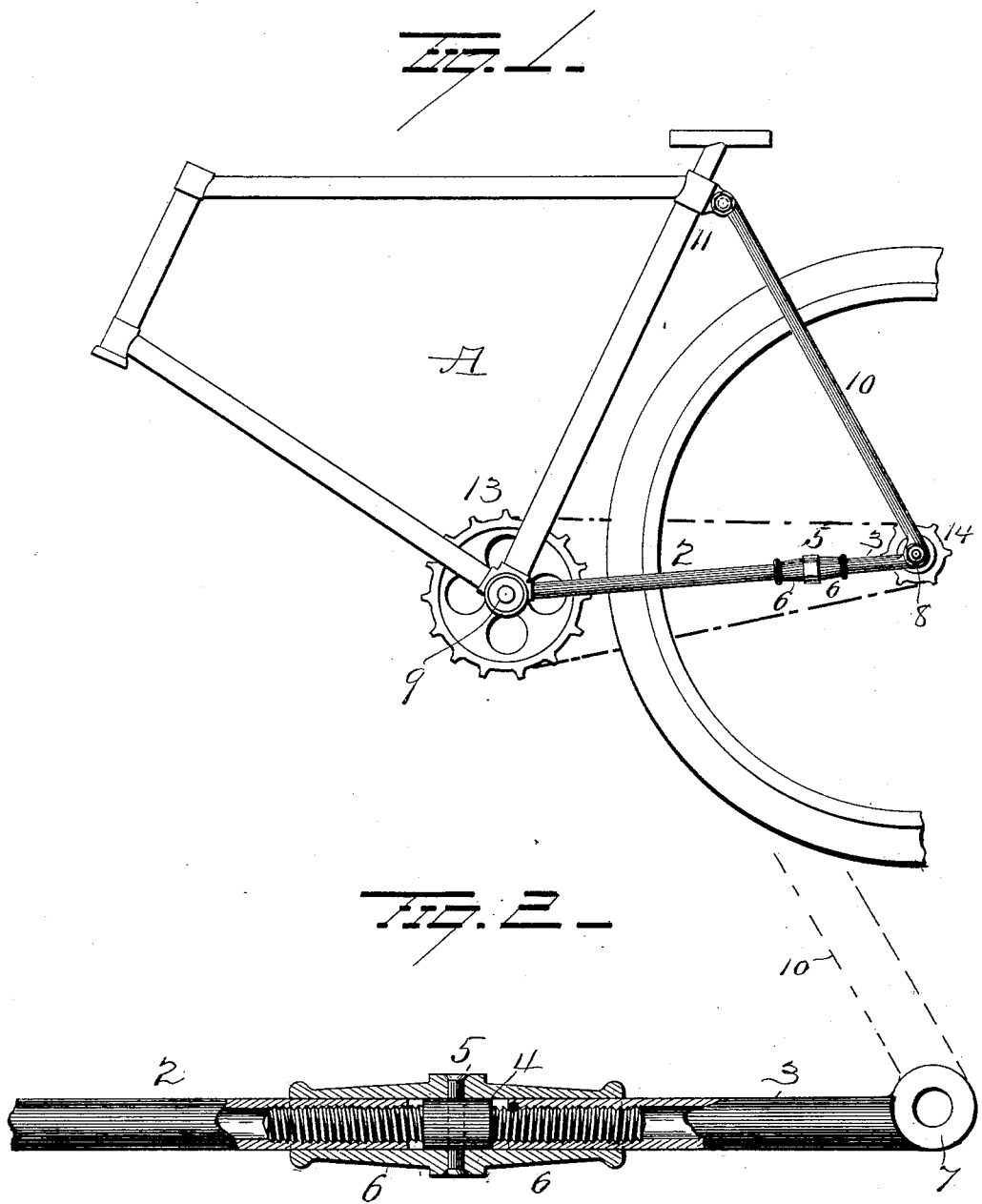
WITNESSES
E. J. Nottingham
G. F. Downing
INVENTOR
P. Pecor
By N. A. Seymour
Attorney
THE NORRIS PETERS CO., PHOTO-LITHO., WASHINGTON, D. C.

UNITED STATES PATENT OFFICE.

PHIL PECOR, OF LENA, WISCONSIN.

BICYCLE.

SPECIFICATION forming part of Letters Patent No. 702,992, dated June 24, 1902.

Application filed June 28, 1899. Serial No. 722,162. (No model.)

*To all whom it may concern:*

Be it known that I, PHIL PECOR, of Lena, in the county of Oconto and State of Wisconsin, have invented certain new and useful Improvements in Bicycles; and I do hereby declare the following to be a full, clear, and exact description of the invention, such as will enable others skilled in the art to which it appertains to make and use the same.

My invention relates to an improvement in bicycles, the object of the invention being to so construct and arrange the rear stays of the bicycle-frame that they can be utilized for regulating the tension of the chain.

With this end in view my invention consists in certain novel features of construction and combinations of parts, as will be hereinafter more fully described, and pointed out in the claim.

In the accompanying drawings, Figure 1 represents a view of a bicycle provided with rear stays constructed in accordance with my invention, and Fig. 2 is a detached sectional view of one of said stays.

A represents a partially-completed bicycle, the frame of which is preferably of the type employing stays which extend from the hub to the axle of the rear wheel and between which the latter rests and moves. The present invention resides in these stays, and they are each made of two sections 2 and 3, the proximate ends of which are screw-threaded interiorly, one section having a right-hand thread and the other a left-hand thread for the reception of a correspondingly-threaded adjusting bolt or screw 4, which latter has a central enlarged portion 5, disposed centrally within a sleeve 6 and secured thereto by means of a pin. The central portion of the sleeve 6 is made with flat faces for the application of a wrench, and the portions of said sleeve at each side of said central portion receive and inclose the inner ends of the sections 2 3 and conceal the greater portions of the screw-threaded sections of adjusting screws or bolts 4, thus covering the joints between the screws and the stay-sections, whereby a neat and attractive finish is imparted to the stays. The interior of sleeve 6 is properly shaped, so as to afford a good hold for revolving the screws or bolts by hand, the polygonal portion being provided simply in case the screw or bolt cannot be revolved by hand.

The rear ends of sections 3 of the stays are provided with eyes 7, located to one side of the longitudinal center of said sections, through which the projecting ends of axle 8 extend, while the forward ends of sections 2 of said stays are secured to hub 9 in the usual manner. Axle 8 is supported in bearings formed in the lower ends of supporting-stays 10, which latter constitute the rear fork and are hinged at their upper ends to the rear upper face of central or upright post 11. The bearings at the lower ends of the stays 10 are also located to one side of the longitudinal center of said stays and preferably on the side opposite to that on which the eyes 7 are located, so that when said eyes and bearings are connected together by axle 8 a hinge-joint will be formed.

When it is desired to regulate the tension of chain 12, which is carried by the driving-gear sprocket-wheel 13 and rear-wheel sprocket 14 in the usual manner, it is only necessary to rotate the sleeve 6 and screws or bolts 4 in the desired direction, which movement on the part of said adjusting bolts or screws will cause the axle 8 to move in a horizontal direction either toward or away from the driving-shaft of the machine, and as the rear wheel, which carries the sprocket 14, is mounted on said axle it will be apparent that said chain will either be loosened or tightened, according to the direction in which the adjusting screws or bolts are rotated.

With the construction now in common use the rear-wheel axle is supported in longitudinal slots in the rear ends of the stays, some of the slots being open and some closed; but in all cases they are adjusted within the slots either by clamping-nuts or adjusting-bolts. With such constructions the rear axle is liable to work loose and be unevenly adjusted. With my device the axle is supported solidly within close-fitting bearings, and can only move forwardly or rearwardly when the bearings are moved by the adjusting devices before referred to.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

In a bicycle, the combination with a crank-hanger, a central post secured thereto and a rear fork pivotally connected with the upper end of the central post, of rear stays, each secured at one end to the crank-hanger and at the other end to the rear fork, each of said stays comprising two alined tubular sections screw-threaded internally at their inner ends, two screws entering the respective tubular sections, a cylindrical head from which said screws project in opposite directions, said head having a diameter equal to that of the tubular sections and disposed between the ends of the latter, a sleeve inclosing the cylindrical head and loosely embracing the adjacent ends of the tubular sections, a pin securing said tube to the cylindrical head, a rear wheel at the rear end of said sectional stays, a sprocket-wheel carried by said rear wheel, another sprocket-wheel mounted in the crank-hanger and a sprocket-chain connecting said sprocket-wheels.

In testimony whereof I have signed this specification in the presence of two subscribing witnesses.

PHIL PECOR.

Witnesses:
GEO. BEYER,
CHARLES JAMES.